(12) United States Patent
Horne et al.

(10) Patent No.: US 8,352,747 B2
(45) Date of Patent: *Jan. 8, 2013

(54) SOFTWARE SELF-CHECKING SYSTEMS AND METHODS

(75) Inventors: William G. Horne, Lawrenceville, NJ (US); Lesley R. Matheson, Discovery Bay, CA (US); Casey Sheehan, Hollister, CA (US); Robert E. Tarjan, Princeton, NJ (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/208,768

(22) Filed: Aug. 12, 2011

(65) Prior Publication Data

US 2011/0302424 A1    Dec. 8, 2011

Related U.S. Application Data

(63) Continuation of application No. 12/504,567, filed on Jul. 16, 2009, now Pat. No. 8,001,388, which is a continuation of application No. 10/172,682, filed on Jun. 13, 2002, now Pat. No. 7,581,103.

(60) Provisional application No. 60/297,451, filed on Jun. 13, 2001.

(51) Int. Cl.
*H04L 9/32* (2006.01)
(52) U.S. Cl. ............................ 713/187; 713/176; 726/26
(58) Field of Classification Search .................. 713/176, 713/181, 187; 726/22, 26–27; 714/37
See application file for complete search history.

(56) References Cited

U.S. PATENT DOCUMENTS

| | | | |
|---|---|---|---|
| 3,796,830 | A | 3/1974 | Smith |
| 4,827,508 | A | 5/1989 | Shear |
| 4,864,494 | A | 9/1989 | Kobus, Jr. |
| 4,977,594 | A | 12/1990 | Shear |
| 5,050,213 | A | 9/1991 | Shear |
| 5,163,091 | A | 11/1992 | Graziano et al. |
| 5,410,598 | A | 4/1995 | Shear |
| 5,530,235 | A | 6/1996 | Stefik et al. |
| 5,534,975 | A | 7/1996 | Stefik et al. |
| 5,535,329 | A | 7/1996 | Hastings |
| 5,629,980 | A | 5/1997 | Stefik et al. |

(Continued)

FOREIGN PATENT DOCUMENTS

EP    0 715 247 A1    6/1996

(Continued)

OTHER PUBLICATIONS

Horne, W. G., et al., "Systems and Methods for Watermaking Software and Other Media," U.S. Appl. No. 09/629,807, filed Jul. 31, 2000, 138 pages.

(Continued)

*Primary Examiner* — Hosuk Song
(74) *Attorney, Agent, or Firm* — Finnegan, Henderson, Farabow, Garrett & Dunner, LLP

(57) ABSTRACT

Software self-checking mechanisms are described for improving software tamper resistance and/or reliability. Redundant tests are performed to detect modifications to a program while it is running. Modifications are recorded or reported. Embodiments of the software self-checking mechanisms can be implemented such that they are relatively stealthy and robust, and so that they are compatible with copy-specific static watermarking and other tamper-resistance techniques.

20 Claims, 11 Drawing Sheets

U.S. PATENT DOCUMENTS

| | | | |
|---|---|---|---|
| 5,634,012 A | 5/1997 | Stefik et al. | |
| 5,638,443 A | 6/1997 | Stefik et al. | |
| 5,715,403 A | 2/1998 | Stefik | |
| 5,754,659 A | 5/1998 | Sprunk et al. | |
| 5,757,914 A | 5/1998 | McManis | |
| 5,892,900 A | 4/1999 | Ginter et al. | |
| 5,910,987 A | 6/1999 | Ginter et al. | |
| 5,915,019 A | 6/1999 | Ginter et al. | |
| 5,917,912 A | 6/1999 | Ginter et al. | |
| 5,920,861 A | 7/1999 | Hall et al. | |
| 5,940,504 A | 8/1999 | Griswold | |
| 5,943,422 A | 8/1999 | Van Wie et al. | |
| 5,949,876 A | 9/1999 | Ginter et al. | |
| 5,982,891 A | 11/1999 | Ginter et al. | |
| 5,999,949 A | 12/1999 | Crandall | |
| 6,009,514 A | 12/1999 | Henzinger et al. | |
| 6,021,272 A | 2/2000 | Cahill et al. | |
| 6,106,396 A | 8/2000 | Alcorn et al. | |
| 6,112,181 A | 8/2000 | Shear et al. | |
| 6,138,119 A | 10/2000 | Hall et al. | |
| 6,157,721 A | 12/2000 | Shear et al. | |
| 6,185,683 B1 | 2/2001 | Ginter et al. | |
| 6,223,337 B1 * | 4/2001 | Blume | 717/126 |
| 6,237,786 B1 | 5/2001 | Ginter et al. | |
| 6,240,185 B1 | 5/2001 | Van Wie et al. | |
| 6,253,193 B1 | 6/2001 | Ginter et al. | |
| 6,292,569 B1 | 9/2001 | Shear et al. | |
| 6,308,320 B1 | 10/2001 | Burch | |
| 6,330,549 B1 | 12/2001 | Merkle | |
| 6,363,488 B1 | 3/2002 | Ginter et al. | |
| 6,389,402 B1 | 5/2002 | Ginter et al. | |
| 6,427,140 B1 | 7/2002 | Ginter et al. | |
| 6,449,367 B2 | 9/2002 | Van Wie et al. | |
| 6,618,484 B1 | 9/2003 | Van Wie et al. | |
| 6,640,304 B2 | 10/2003 | Ginter et al. | |
| 6,658,568 B1 | 12/2003 | Ginter et al. | |
| 6,668,325 B1 | 12/2003 | Collberg et al. | |
| 6,785,815 B1 | 8/2004 | Serret-Avila et al. | |
| 6,829,710 B1 | 12/2004 | Venkatesan et al. | |
| 6,832,316 B1 | 12/2004 | Sibert | |
| 6,922,782 B1 | 7/2005 | Spkyer et al. | |
| 7,051,200 B1 | 5/2006 | Manferdelli et al. | |
| 7,080,249 B1 | 7/2006 | Jakubowski et al. | |
| 2001/0042043 A1 | 11/2001 | Shear et al. | |
| 2002/0010907 A1 | 1/2002 | MacCormack | |
| 2002/0023214 A1 | 2/2002 | Shear et al. | |
| 2002/0048369 A1 | 4/2002 | Ginter et al. | |
| 2002/0087859 A1 | 7/2002 | Weeks et al. | |
| 2002/0112171 A1 | 8/2002 | Ginter et al. | |
| 2002/0152173 A1 | 10/2002 | Rudd | |
| 2003/0041239 A1 | 2/2003 | Shear et al. | |
| 2003/0046244 A1 | 3/2003 | Shear et al. | |
| 2003/0069748 A1 | 4/2003 | Shear et al. | |
| 2003/0069749 A1 | 4/2003 | Shear et al. | |
| 2003/0084003 A1 | 5/2003 | Pinkas et al. | |
| 2003/0105721 A1 | 6/2003 | Ginter et al. | |
| 2003/0163431 A1 | 8/2003 | Ginter et al. | |
| 2004/0054630 A1 | 3/2004 | Ginter et al. | |
| 2004/0059951 A1 | 3/2004 | Pinkas et al. | |
| 2004/0073813 A1 | 4/2004 | Pinkas et al. | |
| 2004/0103305 A1 | 5/2004 | Ginter et al. | |
| 2004/0107356 A1 | 6/2004 | Shamoon et al. | |
| 2004/0123129 A1 | 6/2004 | Ginter et al. | |
| 2004/0133793 A1 | 7/2004 | Ginter et al. | |
| 2005/0027871 A1 | 2/2005 | Bradley et al. | |
| 2005/0050332 A1 | 3/2005 | Serret-Avila et al. | |
| 2005/0060560 A1 | 3/2005 | Sibert | |
| 2005/0060584 A1 | 3/2005 | Ginter et al. | |
| 2005/0108555 A1 | 5/2005 | Sibert | |

FOREIGN PATENT DOCUMENTS

| | | |
|---|---|---|
| WO | WO 96/27155 A2 | 9/1996 |
| WO | WO 97/43761 A2 | 11/1997 |
| WO | WO 98/09209 A1 | 3/1998 |
| WO | WO 98/10381 A1 | 3/1998 |
| WO | WO 98/37481 A1 | 8/1998 |
| WO | WO 99/01815 A1 | 1/1999 |
| WO | WO 99/24928 A2 | 5/1999 |
| WO | WO 99/48296 A1 | 9/1999 |
| WO | WO 00/75925 A1 | 12/2000 |
| WO | WO 01/06374 A2 | 1/2001 |
| WO | WO 01/09702 A2 | 2/2001 |
| WO | WO 01/10076 A2 | 2/2001 |

OTHER PUBLICATIONS

Horning, J. J., et al., "Software Self-Defense Systems and Methods," U.S. Appl. No. 09/629,546, filed Jul. 31, 2000, 190 pages.

Intel Architecture Software Developers Manual, vol. 2, Instruction Set Reference, 1997, Intel Corporation, 566 pages.

Sibert, Olin, et al. "Digibox: A Self-Protecting Container for Information Commerce," Proceedings of the First USENIX Workshop on Electronic Commerce, New York, NY, Jul. 1995, pp. 1-13.

Sibert, Olin, et al., "Securing the Content, Not the Wire, for Information Commerce," InterTrust Technologies Corporation, 1996, 12 pages.

Stefik, M., "Chapter 7, Classification," Introduction to Knowledge Systems, Morgan Kaufmann Publishers, Inc., 1995, pp. 543-607.

Stefik, M., "Letting Loose the Light: Igniting Commerce in Electronic Publication," Internet Dreams: Archetypes, Myths, and Metaphors. Massachusetts Institute of Technology, 1996, pp. 219-253.

StefiK, M., "Letting Loose the Light: Igniting Commerce in Electronic Publication," Xerox PARC, Palo Alto, CA, 1994-1995, 35 pages.

Stefik, M., "Trusted Systems," Scientific American, Mar. 1997, pp. 78-81.

Office Action dated Dec. 13, 2005, issued in related U.S. Appl. No. 10/172,682, filed Jun. 13, 2002, Horne et al.

Office Action dated Aug. 18, 2006, issued in related U.S. Appl. No. 10/172,682, filed Jun. 13, 2002, Horne et al.

Advisory Action dated Dec. 5, 2006, issued in related U.S. Appl. No. 10/172,682, filed Jun. 13, 2002, Horne et al.

Office Action dated Mar. 6, 2007, issued in related U.S. Appl. No. 10/172,682, filed Jun. 13, 2002, Horne et al.

Office Action dated Oct. 17, 2007, issued in related U.S. Appl. No. 10/172,682, flied Jun. 13, 2002, Horne et al.

Office Action dated Apr. 10, 2008, issued in related U.S. Appl. No. 10/172,682, filed Jun. 13, 2002, Horne et al.

Office Action dated Nov. 12, 2008, issued in related U.S. Appl. No. 10/172,682, filed Jun. 13, 2002, Horne et al.

Notice of Allowance dated Apr. 16, 2009, issued in related U.S. Appl. No. 10/172,682, filed Jun. 13, 2002, Horne et al.

Office Action dated Jan. 21, 2011, issued in related U.S. Appl. No. 12/504,567, filed Jul. 16, 2009, Horne et al.

Notice of Allowance dated Apr. 4, 2011, issued in related U.S. Appl. No. 12/504,567, filed Jul. 16, 2009, Horne et al.

* cited by examiner

Illustration of interval construction for n=5 and k=3.

Dependency Graph for Basic Block A.

Dependency Graph for Basic Block B with a single LEA hash function multiplier.

Dependency Graph For Basic Block B with a dual LEA hash function multiplier.

Dependency Graph for Basic Block B with a MOV/SHL/OP hash function.

SOFTWARE SELF-CHECKING SYSTEMS AND METHODS

RELATED APPLICATIONS

This application is a continuation of U.S. application Ser. No. 12/504,567, filed Jul. 16, 2009 now U.S. Pat. No. 8,001,388, which is a continuation of U.S. application Ser. No. 10/172,682, filed Jun. 13, 2002 now U.S. Pat. No. 7,581,103, which claims the benefit of U.S. Provisional Application No. 60/297,451, filed Jun. 13, 2001, all of which are incorporated herein by reference in their entireties.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to software security. More specifically, systems and methods are disclosed for enhancing software security using self-checking techniques.

BACKGROUND OF THE INVENTION

There are many situations in which it is desirable to protect a piece of software from malicious tampering once it gets distributed to a user community. Examples include time-limited evaluation copies of software, password-protected access to unencrypted software, certain kinds of e-commerce systems, and software that enforces rights to access copyrighted content.

Tamper resistance is the art and science of protecting software or hardware from unauthorized modification, distribution, and misuse. One important tamper resistance technique is self-checking (sometimes also called self-validation or integrity checking), in which a program, while running, checks itself to verify that it has not been modified.

SUMMARY OF THE INVENTION

Systems and methods are disclosed for enhancing software security using self-checking techniques. Self-checking mechanisms, as described herein, are suitable for, among other things, client software, including software used for security-sensitive applications such as digital rights management. Embodiments of the self-checking mechanisms described herein can also be combined with software watermarking technology to form a set of integrated tools that enable watermarks and self-checking code to be added to an existing program and activated upon delivery to a client machine. It should be appreciated that the present invention can be implemented in numerous ways, including as a process, an apparatus, a system, a device, a method, a computer readable medium, or as a combination thereof. Several inventive embodiments of the present invention are described below.

In one embodiment, a method of creating a self-checking software program, is provided. Multiple self-checking code sequences are inserted into the program, each of the self-checking code sequences being operable to calculate a function of a portion of the program. Multiple "correctors" are also inserted into the program, and the self-checking code sequences are assigned to overlapping portions of the program, each portion containing at least one corrector. The correctors are assigned values such that the function calculated by the self-checking code sequence assigned to a given portion of the program results in a predefined value if the given portion has not been improperly modified. If improper modification is detected, an appropriate response can be initiated.

In another embodiment, a method of creating a dynamic self-checking program is provided. Self-checking code is inserted into the program, the self-checking code being operable to perform dynamic integrity checks on overlapping intervals of the program. Corrector values may also be inserted, the corrector values being chosen such that the dynamic integrity checks performed by the self-checking code result in a predefined value or values if the program has not been improperly modified.

In yet another embodiment, a self-checking program is provided. The self-checking program includes a first code sequence configured to perform an integrity check on a first portion of the program while the program is running, and a second code sequence configured to perform an integrity check on a second portion of the program that at least partially overlaps the first portion of the program. The program contains self-checking code that checks the integrity of the first code sequence and the second code sequence, and may also include correctors chosen such that the integrity checks performed by the first and second code sequences result in predefined values if the program has not been modified.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by referring to the following detailed description in conjunction with the accompanying drawings, wherein like reference numerals designate like structural elements, and in which.

DETAILED DESCRIPTION

A detailed description of the invention is provided below. While the invention is described in conjunction with several embodiments, it should be understood that the invention is not limited to any one embodiment. On the contrary, the scope of the invention is limited only by the appended claims and encompasses numerous alternatives, modifications, and equivalents. For example, while some embodiments are described in the context of the Intel x86 architecture, those skilled in the art will recognize that the disclosed systems and methods are readily adaptable for broader application. For example, without limitation, the present invention could be readily adapted to any suitable platform. In addition, while numerous specific details are set forth in the following description in order to provide a thorough understanding of the present invention, the present invention may be practiced according to the claims without some or all of these details. Finally, for the purpose of clarity, certain technical material that is known in the art has not been described in detail in order to avoid obscuring the present invention.

In the following discussion, a static self-checking mechanism will generally refer to a mechanism that checks a program's integrity once, during start-up, while a dynamic self-checking mechanism will generally refer to a mechanism that verifies a program's integrity multiple times while the program is running. Also note that the term "random," as used throughout this document, is meant to encompass processes or functions that are pseudo-random or effectively-random, as well as processes or functions that are truly random in a strict mathematical sense.

Figure 1:
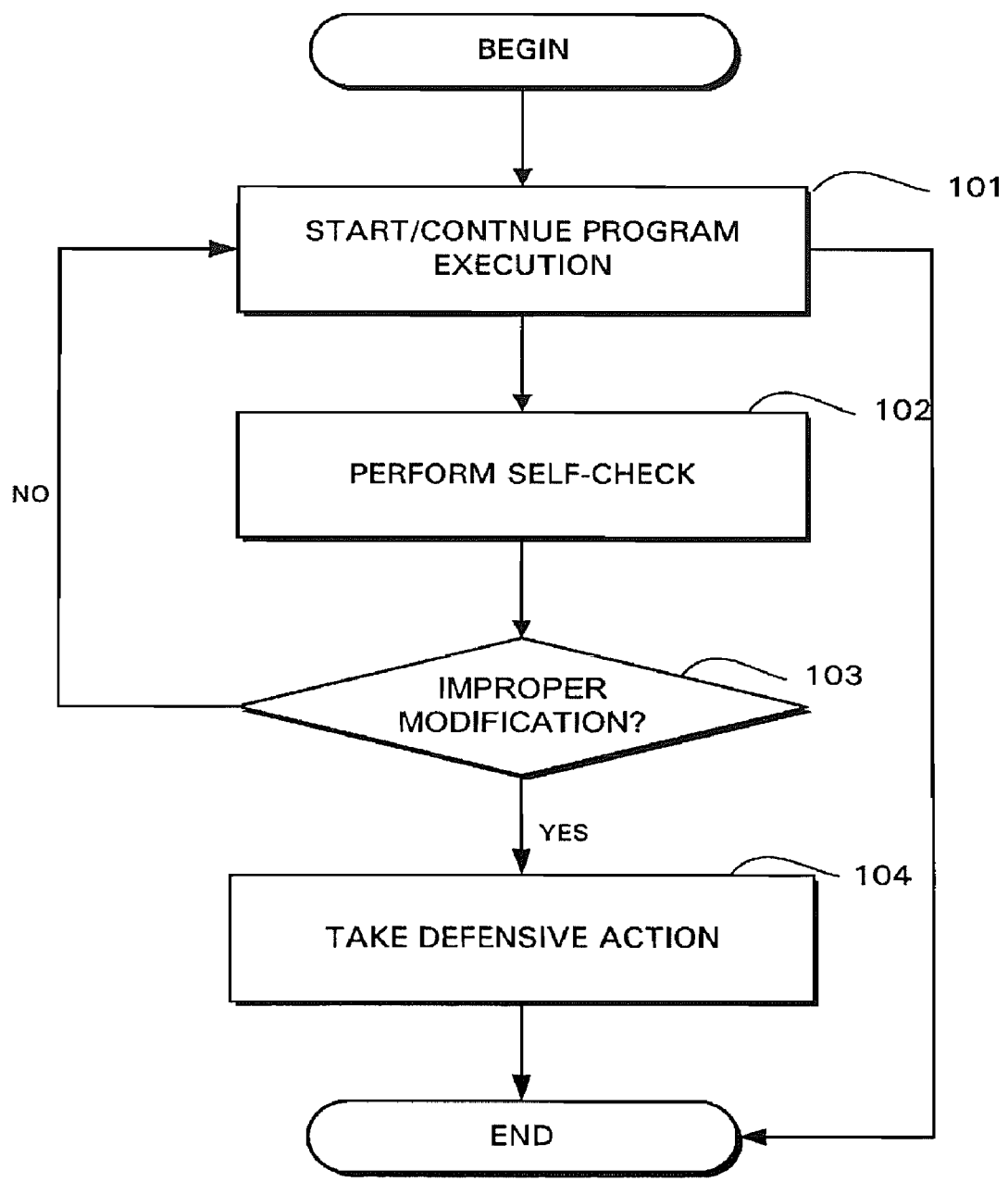
FIG. 1 illustrates a dynamic self-checking mechanism in accordance with an embodiment of the present invention.

A goal of a dynamic program self-checking mechanism is to detect modifications to a program as it is running, and, upon detection, to trigger an appropriate response. FIG. 1 illustrates a dynamic self-checking mechanism used to prevent unwanted tampering with a program. As shown in FIG. 1, the self-checking code is activated at various times during program execution (101/102). When the self-checking mechanism detects an improper modification to the code (i.e., a "Yes" exit from block 103), the program takes appropriate defensive action (104), such as stopping program execution, disabling certain functions or access to certain data, notifying a system administrator, and/or the like. If no improper modifications are found, the program continues normal execution (i.e., a "No" exit from block 103).

An effective self-checking mechanism should be robust against various attacks while fulfilling various non-security objectives. Some of the characteristics of an effective self-checking mechanism are set forth below. It should be appreciated, however, that embodiments of the present invention need not possess each of these characteristics or meet each of these goals.

Functionality

Comprehensive and Timely Dynamic Detection. It is desirable for a self-checking mechanism to be able to detect the change of a single bit in any non-modifiable part of the program while the program is running and relatively soon after the change occurs. This helps to prevent an attack in which the program is modified temporarily and then restored after deviant behavior occurs.

Separate, Flexible Response. Separating the response mechanism from the detection mechanism enables the response to be customized depending upon the circumstances, and makes it more difficult to locate the entire mechanism having found any part.

Modular Components. The components of the self-checking mechanism are preferably modular and can be independently replaced or modified, making future experimentation and enhancements easier, and making extensions to other executables and executable formats easier.

Platform Independence. Although the implementation of a self-checking technology may vary from platform to platform, it will generally be desirable for the general mechanism to be adaptable to virtually any platform.

Insignificant Performance Degradation. A self-checking mechanism preferably should not noticeably slow down the execution of the original code, or add significantly to the size of the code. For example, for many consumer applications it will be desirable to have no more than an approximately 5% impact on performance.

Integrated Tools. It may be desirable to combine the technology for inserting a self-checking mechanism with the technology used to insert watermarks (e.g., copy-specific static watermarks) or other software-self defense mechanisms such as customizations, thus forming a single set of integrated tools.

Suitable for a Large Code Base. Since the software that could benefit from the addition of self-checking code will often be relatively large, it is desirable for the self-checking techniques to be applicable to a relatively large code base (e.g., several megabytes).

Security

Two general attacks on a software self-checking mechanism are discovery and disablement. Several techniques for discovering or disabling a software self-checking mechanism are set forth below, as are several ways to prevent or inhibit these discovery and disablement techniques.

Discovery

Static Inspection. One way to detect the presence of a self-checking mechanism is simply to examine the program's static image. To counter such an attack—and automated versions of such an attack in particular—self-checking mechanisms can be obfuscated and made relatively stealthy. Any suitable obfuscation/stealth technique can be used for this purpose, including without limitation those described in commonly-assigned U.S. Pat. No. 5,892,900, entitled "Systems and Methods for Secure Transaction Management and Electronic Rights Protection," issued Apr. 6, 1999 ("the '900 patent"), commonly-assigned U.S. patent application Ser. No. 09/095,346, entitled "Obfuscation Techniques for Enhancing Software Security," filed Jun. 9, 1998 ("the '346 application"), commonly-assigned U.S. patent application Ser. No. 09/629,546, entitled "Software Self-Defense Systems and Methods," filed Jul. 31, 2000 ("the '546 application"), and commonly-assigned U.S. patent application Ser. No. 09/629,807, entitled "Systems and Methods for Watermarking Software and Other Media," filed Jul. 31, 2000 ("the '807 application"), each of which is hereby incorporated by reference.

Use of Debuggers and Similar Software Tools. Off-the-shelf dynamic analysis tools such as debuggers and profilers can pose a significant threat to self-checking technology. Self-checking code typically makes use of memory references (reads) into executable code sections. These can be detected with a debugger. Accordingly, it is desirable to employ mechanisms that detect the use of debuggers and respond appropriately (or course, a debugger that relies on modifying the code will generally be defeated by the self-checking mechanism). Any suitable debugger-detection mechanism can be used, including without limitation those described in the '546 application or the '900 patent.

Detection of Reads into the Code. As indicated above, self-checking code typically relies on memory reads into executable code sections, and these can be detected by debuggers or other means. A way to thwart both static and dynamic detection of reads into the code sections is to obfuscate the read instructions so that the code section addresses that are targeted by such reads are never present in a single register. Detection will thus require the attacker to actually notice that a read has occurred, since inspecting the code or monitoring the registers will not, by itself, reveal this fact.

Generalization. As described in more detail below, in some embodiments self-checking mechanisms may make use of a relatively large number of lightweight testers, each of which consists of a small contiguous section of code. An attacker, having discovered one such tester, could look for others by searching for similar code sequences. To thwart this attack, testers can be customized, so that generalizing from one tester to others is difficult: not only are there multiple classes of testers, each class performing a different test (e.g., computing a different hash function), but within each class the testers use different code sequences to do the same job.

Collusion. In some embodiments, self-checking mechanisms may be used on watermarked code. Since watermarking will typically make each copy of the code slightly different, an attacker might be able to locate the tester mechanism by obtaining two differently marked copies of the code and comparing them. The differences might reveal not only the watermarks but any changes needed in the self-checking mechanism to compensate for different watermarks. As described in more detail below, to counter such an attack bits or code fragments that vary in order to compensate for the watermarks can be used. These "correctors" are preferably separated from the testers and the response mechanism. Therefore, neither the testers nor the response mechanism can be readily-detected by collusion. In addition, detection of the correctors by collusion would provide an attacker with very little information, as knowing the correctors and their values does not facilitate discovering or disabling the rest of the mechanism. The use of customization, in which there would be many, radically different copies of the code, could also foil this kind of attack.

Inspection of Installation Patches. In some embodiments, the final step of the watermarking and self-checking initialization process relies on using a patch file to modify a previously obfuscated, non-functional executable. Inspection of the patch file might reveal some parts of the self-checking mechanism. Thus, in some embodiments the only parts of the self-checking mechanism that are contained in the patches are the correctors, not the testers or the response mechanism.

Disablement

It is generally desirable to eliminate or minimize single points of failure, and to require discovery and modification of all or most of the self-checking mechanism for an attacker to succeed.

Modifying the Testers. One possible disabling attack is to modify one or more testers so that they fail to signal a modification of the tested code section. Thus, in a preferred embodiment redundant testers are used to provide overlapping coverage, so that each tester is tested by several others. Disabling one or more of the testers by modifying them will produce detection of these changes by the unmodified testers. Thus, all or most of the testers must be disabled for this kind of attack to succeed.

Modifying the Response Mechanism. Another disabling attack is to modify the response mechanism. Again, if a redundant testing mechanism is used, substantially all of the response functionality must be disabled for such an attack to succeed. While, in some embodiments, direct calls to the tamper response mechanism can be used, stealthier, more robust tamper-response mechanism can also or alternatively be used, such as variably delayed responses and the use of multiple paths to the response code.

Modifying Correctors. Another possible attack is to modify the code so that it behaves incorrectly and still does not trigger the testers. Again, the use of multiple overlapping hash computations makes such an attack unlikely to succeed unless all or most of the testers are discovered. Since discovery of all of the testers would also allow a successful tester-disabling attack, the former attack poses no greater a threat than the latter.

Temporary Modifications. An attacker might attempt modify the code so that it behaves anomalously, and then restore the code to its original form before the self-checking mechanism detects the change. The use of dynamic, frequent, and/or redundant self-checking minimizes this threat.

Integration

Although sometimes hard to characterize or measure, effective protection often appears to involve a set of tamper resistance techniques working together to confound an adversary. Self-checking alone may not be sufficient to robustly protect software. The level of protection from tampering can be improved by using techniques that thwart reverse engineering, such as customization and obfuscation, techniques that thwart debuggers and emulators, and methods of marking or identifying code, such as watermarking or fingerprinting. These techniques reinforce each other, making the whole protection mechanism much greater than the sum of its parts. Thus, in a preferred embodiment, a self-checking mechanism allows for easy integration into the software application, and also supports or is otherwise compatible with other software self-defensive mechanisms such as watermarking.

In some embodiments it may be desirable to utilize code-profiling tools effectively, and to maintain consistency with legacy software watermarking mechanisms. For example, code-profiling mechanisms like TracePoint can be adapted to enable the modification of a program's binary image, thus enabling self-checking information to be inserted directly into the compiled version of a program.

Algorithm Design

Various embodiments of self-checking mechanisms are described below, followed by a more-detailed description of various aspects of these embodiments.

Components and Embedding Process

In preferred embodiments, the self-checking mechanism includes a collection of two basic kinds of components: testers and correctors. These components can be embedded into an executable using the following process:

Step 1: Source-code processing. Insert a set of testers, coded in assembly language, into the source code of the executable.

Step 2: Object-code processing.

Step 2A: Shuffle/rearrange groups of basic blocks of the object code, thereby randomizing the tester distribution.

Step 2B: Insert correctors, at least one per tester, into the object code.

Step 2C: Associate a corrector and a tester interval with each tester, in such a way as to provide redundant coverage of the executable and so that the correctors can later be set in an appropriate order to make the testers test correctly.

Step 3: Installation-time processing.

Step 3A: Compute watermark values

Step 3B: Compute corrector values given the watermark values.

Step 3C: Form patches containing the watermark and corrector values.

Step 3D: Install the program by combining the patches with a pre-existing, non-functional executable to prepare a watermarked, self-checking, fully functional executable.

Figure 2A:
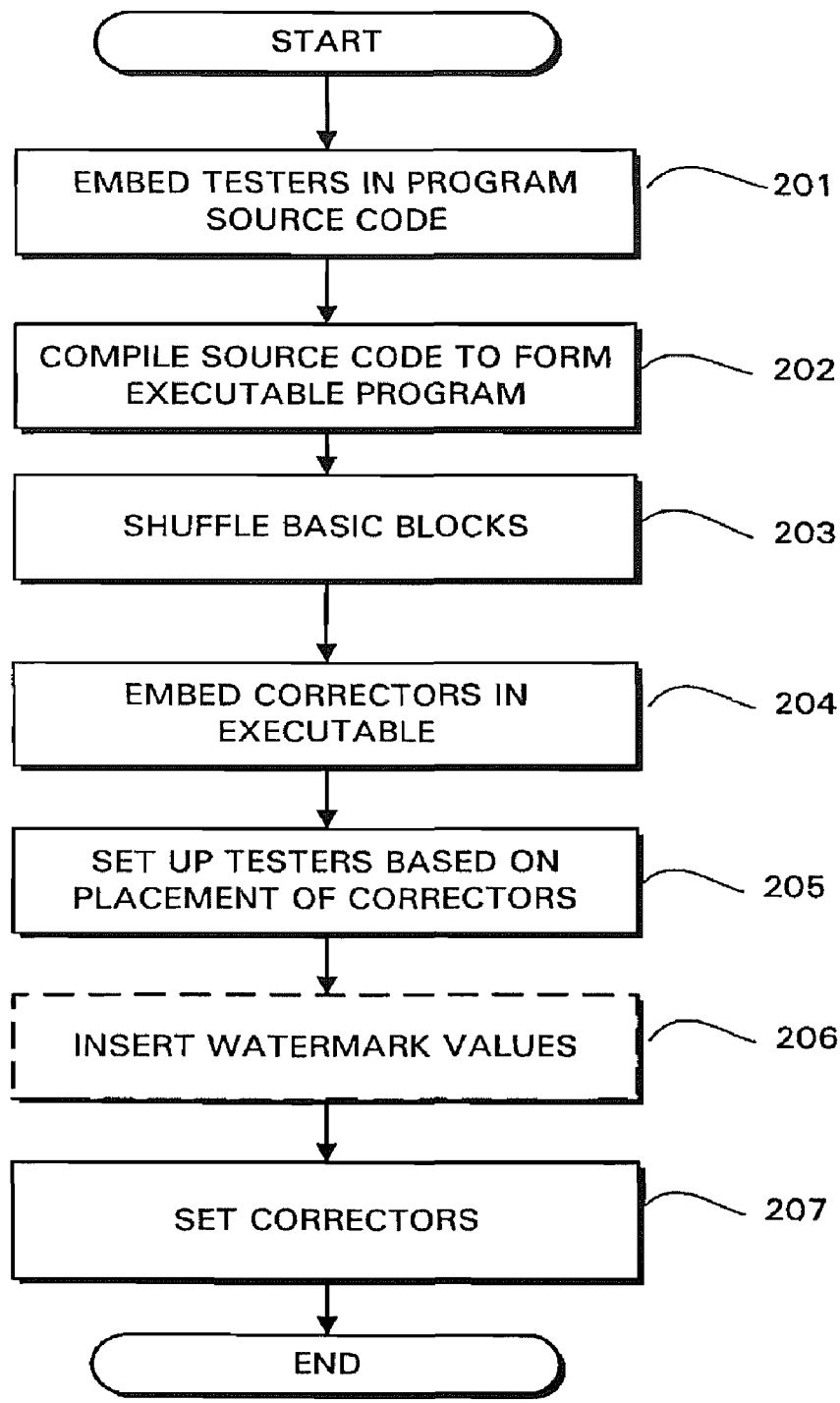
FIG. 2a illustrates a method for inserting self-checking functionality into a software program.
Figure 2B:
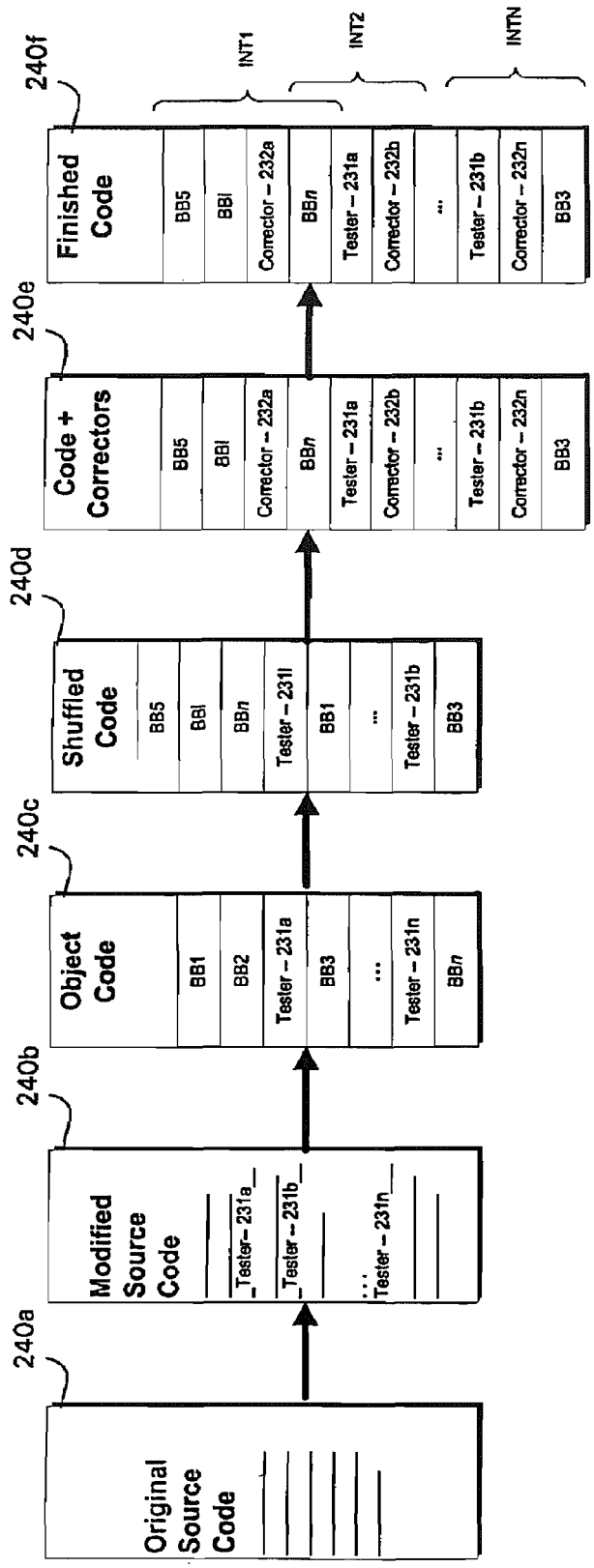
FIG. 2b further illustrates a method for inserting self-checking functionality into a software program.

Exemplary embodiments of the foregoing process are illustrated in FIGS. 2a and 2b. Referring to FIG. 2a, in step 201 testers are embedded in the program's source code. The program is then compiled (202). A binary code modification tool (such as that described above) is then used to shuffle the basic blocks of the executable, thereby creating a relatively uniform distribution of testers (203). (Note that only the relative efficiency and security of self-checking, not its correctness, relies on this shuffling.) The correctors are then embedded in the executable (204), the testers are set up to test a portion of the program, based on the corrector placement (205), and the correctors are set such that the testers evaluate to a predefined result (207). If copy-specific watermarks are being applied to the software, then, typically at installation time, the watermark values are inserted into the code (206), and the correctors are set to compensate for the watermark values (207).

FIG. 2b illustrates the various modifications that occurs to a program 240 during the process described above. As shown in FIG. 2b, testers 231 are inserted into the original source code 240a to form modified source code 240b. The modified source code is compiled to form object code 240c. Because testers 231 may be bunched in object code 240c, the basic blocks can be shuffled such that testers 231 are sufficiently randomized in their distribution, yielding shuffled object code 240d. Next, correctors 232 are inserted, preferably at least one corrector 232 per tester 231. Finally, the testing intervals are defined so that there is redundant coverage of the executable, the testers are assigned to the intervals, and the correctors are set to make the testers yield a predictable result if the code has not been improperly modified.

As indicated above, in a preferred embodiment, testers are inserted into source code instead of object code, as this facilitates the use of the compiler and the assembler to protect register contents If, instead, testers were inserted into object code it may be difficult to insure that the registers used by the testers did not conflict with the registers being actively used by the object code at the insertion point. By inserting the testers in the source code, the compiler will do the appropriate register allocation to avoid any conflicts. This insertion method also affords more control over the runtime performance of the self-checking mechanism, since testers can be more easily placed in code segments with desired performance characteristics. On the other hand, it will generally be difficult to identify the final locations of the testers in the executable, and instead the random block-shuffling done by the binary code modification tool will generally be relied upon to obtain the desired static distribution of the testers in the executable. Object-level placement of the correctors, however, provides great control over their static distribution, which is generally their most important attribute.

In some embodiments, it may be desirable to support the combination of self-checking and software watermark embedding (e.g., such as that described in the '807 application). In comparison with watermark embedding, there are generally two extra steps in the self-check embedding process: embedding the correctors and setting up the testers. Embodiments of the present invention enable both mechanisms to be embedded at once. In addition, in order for self-checking to work in combination with copy-specific watermarking performed at installation time, the self-checking mechanism should either avoid checking the watermarks or should be modified at installation time to correct for the watermark values. Preferred embodiments of the present invention take the latter approach, since it is generally more secure. It should be noted, however, that the former approach could be used instead. In a preferred embodiment an "intelligent patching" process is used, in which both watermarks and correctors for the self-checking mechanism are inserted into a set of patches on the server side. These patches are sent to the client, which patches the code to produce a working executable. The patches preferably contain no information about the code outside of the patches. This minimizes security risks on the client, time and space transferring the patch list, and time and space on the server for maintaining and computing patch lists. The use of linear hash functions for the self-checking mechanism can be helpful in implementing such a design. If copy-specific watermarking is not used, or an entire copy of the executable can be delivered at installation time, then the patching mechanism is generally not needed.

Testers

Figure 3:
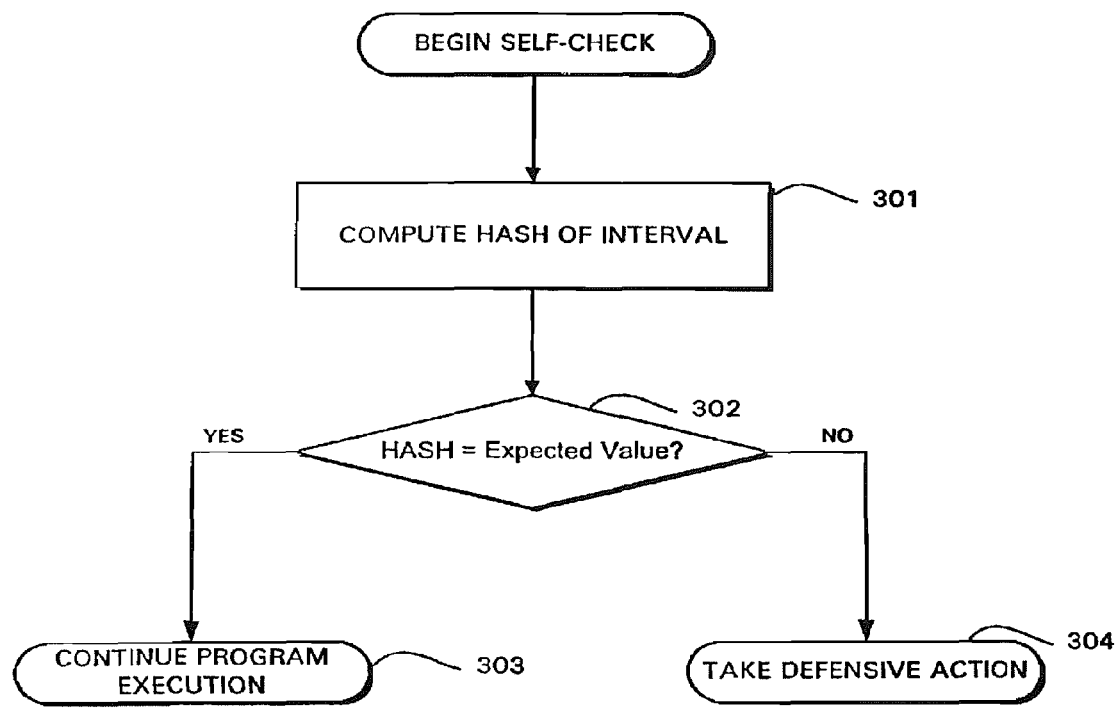
FIG. 3 illustrates a technique for checking a portion of a software program for unauthorized modification.

A preferred group of embodiments make use of a collection of testers, such as that illustrated in FIG. 3, each of which computes a hash (e.g., a pseudo-random many-to-one mapping) of a preferably contiguous section of the code region (301) and compares the computed hash value to the correct value (302). An incorrect value triggers the response mechanism (i.e., a "No" exit from block 302). Otherwise, normal program execution continues (i.e., a "Yes" exit from block 302).

Since it is desirable to test all of the code as often as possible, one possibility would be to have each tester test the entire code section. This, however, may be too time-consuming on relatively large programs, and may not be stealthy enough. Thus, in a preferred embodiment each tester only tests a contiguous section that is a few hundred thousand bytes long (or some other suitable length, depending on the application and/or computing resources at hand).

To set the testing frequency and the size of the code tested by each tester, a balance should be struck between performance, security, and stealth objectives. Experiments on a set of Intel® Pentium processors for a variety of linear hashes suggests that performance is relatively invariant until the size of the code interval being tested exceeds the size of the L2 cache. With Pentium II processors, a marked deterioration of performance was observed when the code interval size exceeded 512 kilobytes. Breaking the computation into pieces also addresses the threat model and design objectives described above and makes the self-checking mechanism stealthier. The testers execute quickly, without observable interruption to the program execution. Thus, in a preferred group of embodiments, each of the testers tests a contiguous section that is a few hundred kilobytes long.

A single tester, when executed, computes the hash value for its assigned interval and tests the result. In some embodiments, more distributed alternatives could be used, in which a single call of a tester would only partially compute a hash value. In such embodiments, either a single tester or several different testers could be responsible for the complete computation of the hash of an interval. Such embodiments may, however, be unnecessarily complicated and less stealthy, and may require storage of extra state information (e.g., the partially computed hash function).

There are a variety of ways to store the correct hash values. One possibility is with the testers themselves. However, this may pose a security risk. Because the self-checking mechanism tests the entire code, and watermarks differ among different copies of the code, many of the hash values will differ among copies. In the absence of code customization (which creates different versions of the code), the hash values can be exposed by a collusion attack, in which different copies of the code are compared. Storing the hash values with the testers thus potentially exposes the testers to a collusion attack. Another difficulty is the circularity that may arise if testers are testing regions that include testers and their hash values: there may be no consistent way to assign correct hash values, or such an assignment may exist, but be very difficult to compute.

Another possibility that avoids both of these problems (i.e., revealing the testers by collusion, and circularity of hash value assignment) is to store the hash values in the data section. But then the hash values themselves are unprotected from change, if the self-checking mechanism does not check the data section. This problem could be avoided by dividing the data section into fixed data and variable data, storing the hash values in the fixed data section, and testing the fixed data section, but this alternative may still be relatively insecure.

Thus, in a preferred embodiment, each hash interval has a variable word, called a corrector. A corrector can be set to an arbitrary value, and is preferably set so that the interval hashes to a fixed or otherwise predictable value (e.g., zero or a value within a predefined range of values) for the particular hash function used by the tester testing the interval. Collusion may reveal the correctors, but not the testers. Since the correctors are themselves tested, changing them is not an easy job for an attacker. Each tested interval has its own corrector, and, in a preferred embodiment, is tested by one tester. Multiple testers could be used to test the same interval, but this approach generally adds more complexity than it does security.

Another important design decision is how to trigger the execution of the testers. In preferred embodiments, testers are triggered by normal program execution, and are sprinkled in-line in the existing code. Alternatives include having one or more separate tester threads, or triggering testers by function calls, exceptions, or some other specific events. However, these alternatives may not be as stealthy as the preferred approach. Having separate tester threads in combination with an in-line triggering mechanism may provide additional security through diversity.

A third design decision is the choice of hash functions. In preferred embodiments, chained linear hash functions are used, as linearity is generally important to make installation easy, especially in embodiments where the actual hash values are not known until installation time, and partial hash values are pre-computed and later combined with the values of the software watermarks. In a preferred embodiment, multiple hash functions are used, so that knowing a hash interval and a corrector site is still not enough information to set a corrector value to compensate for a code change.

Testing Pattern

In preferred embodiments, the entire executable code section is covered with overlapping intervals, each of which is tested by a single tester. In one embodiment, the overlap factor (i.e., number of different testing intervals containing a particular byte) is six for most bytes. The testers are randomly assigned to the intervals. The relatively high overlap plus the random assignment provide a high degree of security for the testing mechanism: changing even a single bit requires disabling a large fraction of the testers to avoid detection, even if some of the testers are relatively ineffective because they are executed infrequently.

In a preferred embodiment, the choice of interval size is based on tester performance. As indicated above, experiments were performed with simple hash functions in which the size of the interval was varied from five thousand bytes to three million bytes. Hashing was very fast and performance did not degrade until the interval size reached about five hundred thousand bytes, an effect that was probably attributable to the 512k byte L2 cache size of the Pentium chip of the system upon which the experiments were performed. Since many applications are larger than 512k bytes, obtaining good performance from the testing mechanism will generally entail breaking the computation either spatially (into intervals) or temporally (into partial hash calculations). In a preferred embodiment, the spatial break-up approach was used. In other embodiments, temporal break-up could be used, since it might result in slightly simpler, and thus more stealthy, tester components. (Each partial hash calculation can be loopless, although it loads a previously computed partial hash value and stores its own calculated partial hash value.)

Correctors and Intervals

Each interval has its own corrector, whose value can be set so that the interval hashes to a predefined or predictable value (e.g., zero). In preferred embodiments, each corrector is a single 32-bit unsigned integer. Correctors are placed between basic code blocks using post-compilation binary manipulation (performed, e.g., manually or using a binary code modification tool). Since everything between basic blocks is dead code, control is not transferred to the correctors. An alternative would be to insert correctors as live code no-ops. In a preferred embodiment, the former approach is used, since it is believed to be simpler and possibly stealthier.

In preferred embodiments, correctors are inserted as uniformly as possible throughout the code. Intervals are then constructed based on the desired degree of interval overlap, using randomization to select interval endpoints between appropriate correctors. This construction is such that it is possible to fill in corrector values in a left-to-right pass to make all the intervals hash to zero. That is, there are no circular dependencies in the equations defining the corrector values. Any such circularities would make corrector values hard to compute, or, worse, consistent corrector values might not even exist. An alternative approach is to allow such circularities and to solve the resulting (sparse) system of linear equations to compute corrector values.

Computing corrector values make use of invertible hash functions that facilitate working backwards from the desired hash value (e.g., zero) to the needed corrector value.

Tamper Response

Another important component is the mechanism that invokes action if tampering is detected. In one embodiment each tester calls the anomaly reporting mechanism directly via a simple function call.

Alternatively, or in addition, indirect response mechanisms could be used. It is desirable for the response mechanism to avoid passing the execution of a response through a single point of failure. From an integration perspective, however, it is also desirable to make the mechanism easy to integrate and compatible with other software protection mechanisms used in the application. Depending on the relative importance of each of these goals in a given application, a different tamper response mechanism may be desirable. For example, if the integration perspective is relatively more important, it may be desirable to utilize a simple function call to trigger the tamper response, as indicated above. If, on the other hand, the stealth and robustness of the response mechanism is deemed a more important concern, then it may be desirable to use, e.g., multiple access paths with a variable number of steps and/or running time.

It will be appreciated that any suitable tamper response (or combination of responses) can be used, including without limitation, halting further execution of the program; recording the detection of the modification; notifying a system administrator, the user, and/or a third party; denying access to certain data, functionality, and/or system resources; erasing certain data; modifying further execution of the program; or the like.

Tester Design and Placement

In a preferred embodiment, testers map relatively large intervals of the executable (e.g., several hundred thousand bytes) into relatively small sets of values (e.g., 32 bits) by using easy-to-compute, but "scrambling," mappings or functions (e.g., hash functions). The idea is that any changes to the interval being hashed will also change the value returned by the tester, and thus result in detection if the tester output is compared to the correct hash value (e.g., zero, or some other predefined value or values). Of course, there is some probability of a changed interval mapping to the correct value, but with a good choice of hash functions this chance can be minimized (e.g., $2^{-32}$).

In preferred embodiments, testers have some or all of the following characteristics, and/or meet some or all of the following objectives:

Lightweight Hash Functions. In many cases, it will be desirable for the execution of the testers to have at most an insubstantial impact on program performance. Lightweight hash functions can be used to achieve this goal. For example, an additive chaining mechanism can be combined with a simple 32-bit mapping that uses a few arithmetic or logical operations. In addition to being fast, simple hash functions are generally stealthier than standard hash functions such as CRC32 or SHA, since they typically consist of very short instruction sequences.

Multiple Hash Functions. To defend against attacks based on knowledge of the hash functions used by one or more testers, multiple, randomly selected hash functions are preferably used. A multiplicity of lightweight hash functions will generally be sufficiently secure for most applications; the use of cryptographically-strong hash functions will generally buy little or nothing here.

Summarizable Hash Functions. Because, in some embodiments, watermark values and corrector values are computed in a final pass at installation time, partial hash functions in such embodiments are preferably easily summarizable.

Stealthy Testers. To make testers hard to find by manual or automatic code inspection, they should look like any other part of the application into which they are inserted. Thus, the obfuscation techniques that are applied to the application can also be used to help hide the testers. In addition, short testers will generally be stealthier than long testers.

Resistance to Auto-collusion. In an auto-collusion attack, an attacker uses his or her identification of one tester to help find others based on their similarity to the first. To make an auto-collusion attack more difficult, short, customized testers can be used. Ideally, each tester should be as different from the others as possible.

Obfuscated Address Calculation. A vulnerability of testers is that, unlike "normal" code, they load bytes from the executable. Thus, in preferred embodiments, testers are designed such that .text section addresses do not appear in the general-purpose registers at any given time, thus complicating a "sampling" attack in which the contents of the registers and the stack are monitored for suspicious values such as .text section addresses. Complicated addressing modes provide one way of implementing this idea.

Minimal Impact on Program Development. Testers are inserted into the source code and later (post-compilation/binary code modification) "stamped" with the start and end addresses of the interval to be hashed. Unstamped testers should not trigger the response mechanism, so that unstamped testers are harmless to program development.

Linear Hash Functions

Preferred embodiments make use of relatively lightweight hash functions built from one or more arithmetic or logical operations. Such functions can run 8-10 times faster than CRC32, a standard 32-bit chained hash function.

In experiments that were performed using an "exclusive-or" chained hash function, the testers ran in 1-2 milliseconds per 128k bytes on a 200 Mhz Pentium. This is an upper bound on the expected performance of production testers, since the experimental testers also gathered extra information for use in development. The experimental testers were fast enough that adding them to a program would not significantly impact its performance.

In a preferred embodiment, chained hash functions are used, since they are readily invertible and summarizable. In particular, given an interval of data d, consisting of the words $d_1, d_2, \ldots d_n$, the value $h_n(d)$ of the hash function on d is defined recursively by $h_0(d)=0$, $h_i(d)=c^*(d_i+h_{i-1}(d))$ for $0<i\leq n$, where c is a suitably chosen non-zero multiplier that defines the hash function.

Such a hash function is easily invertible, since we have $h_{i-1}(d)=h_i(d)/c-d$, for $0<i\leq n$, which can be used recursively to compute $h_i(d)$ for any value of i, given $h_n(d)$.

Furthermore, the hash function is easily summarizable in the following sense. If we generalize the recurrence defining h to $h_0(x,d)=x$, $h_i(x,d)=c^*(d_i+h_{i-1}(x,d))$, and view d as a constant vector and x as a variable, then $h_n(x,d)$ is a linear function of x. Namely, $h_n(x,d)=a_n(d)x+b_n(d)$, where $a_n$ and $b_n$ are defined recursively by $a_0(d)=1$, $b_0(d)=0$, $a_i(d)=c^*a_{i-1}(d)$, $b_i(d)=c^*(d_i+b_{i-1}(d))$, for $0<i\leq n$. Finally, the inverse function of $h_n$ is also linear, and can be defined recursively in a similar way.

Invertibility and summarizability mean that, given an interval that is mostly constant but has certain variable words (e.g., watermark slots) and a "corrector" word, a representation of the hash function can be precomputed that requires space linear in the number of watermark slots. Given values for the watermark slots, a value for the corrector can be computed that makes the entire interval hash to zero (or some other predefined value), in time proportional to the number of watermark slots. The precomputation time to construct the summary of the hash function is linear in the length of the interval. This computation is the final step in activating the testers. One problem in the actual corrector computation for, e.g., Intel x86 executables is that the corrector is not necessarily aligned on a word boundary relative to the start and end of the hashed interval. This can be handled, however, at the cost of complicating the calculation somewhat. Another possibility is to explicitly align the correctors, if necessary by providing, e.g., 7-byte corrector slots rather than 4-byte slots.

In preferred embodiments, the constant multipliers used to define the hash functions are chosen from a small set that allows the hash computation to be performed without an explicit multiply instruction. In one embodiment, a collection of 30 possible hash functions is used, corresponding to different multipliers. To expand the set of possible hash functions, an additive constant could be included in the hash function (either by redefining the initial condition to be $h_0(d) = r$ or by redefining the recurrence to be $h_i(d)=c*(d_i+h_{i-1}(d)+r)$, for $0<i\leq n$). This would increase the set of possible hash functions to $30*2^{32}$, although in many situations having around 30 different hash functions should be sufficiently secure, since an attacker will generally need to know not only the hash function but the start and end of the hashed interval, which seems as hard to determine as finding the tester itself.

Tester Construction and Customization

To help make testers stealthy, a tester prototype can be implemented in C and compiled to get an assembly language tester prototype. This may help minimize the presence of unstealthy assembly language constructs, specifically those that would not be generated by a compiler. However, in order to make the resulting testers practical, in some embodiments some or all of the following three modifications can be made to this compiled tester prototype: First, the prototype can be modified so that an unstamped tester would not call the response mechanism. Second, an obfuscation variable can be added to the address calculations to guarantee that no code section addresses appear in general-purpose registers during the running of a tester (indicating a read of a code section address). Third, the tester can be simplified slightly.

Next, in preferred embodiments a variety of customizations are made to the testers to ensure that each tester has a unique code sequence, thus increasing the difficulty of an auto-collusion attack. These customizations might, for example, include changing the multiplier defining the hash function and the exact instructions used to compute the hash function, shuffling the basic blocks of the tester, inverting the jump logic of conditional jumps, reordering instructions within basic blocks, permuting the registers used, and doing customization of individual instructions. These techniques can be used to generate a large set of distinct tester implementations (e.g., around 3 million) with relative ease, each occupying less than 50 bytes. A more detailed description of an exemplary tester design process and a resulting tester set appears in Appendix A, along with a discussion of other possible customizations.

Tester Placement

As discussed above, in a preferred embodiment testers are placed in-line in the code. These testers fire as they are reached during normal execution. It is desirable for testers to execute frequently enough that most or all of the code is tested often during normal execution, but not so often that tester firing causes a significant efficiency degradation. In one embodiment, source-level tester placement is used in order to place testers most effectively to realize these conflicting performance goals. This can involve significant manual effort; however, automated techniques could also, or alternatively, be used.

In some embodiments it may be desirable to insert the various individual testers in source program functions so that the testers are executed to meet coverage objectives in what are deemed to be typical program runs. To achieve this goal, in one embodiment profiling tools are used to count function executions during runs of the application. Functions that are not run at least once during start-up and at least once after start-up are discarded. The remaining functions are placed in increasing order by execution frequency, and testers are inserted into the functions in order, one tester per function, until the desired number of testers are inserted (e.g., around 200 for a several megabyte application).

It was found that this placement of testers, when combined with the method of interval construction and tester-to-interval connection described elsewhere herein, resulted in acceptable dynamic testing coverage. A significant drawback, however, is that the testers are typically bunched in the executable, because they tend to be inserted into library functions that appear together in the executable. To overcome this problem, a code profiling tool can be used to shuffle the basic blocks of the executable and disperse the testers more uniformly.

A straightforward analysis shows that random shuffling of code blocks, assuming uniform block size and at most one tester per block, results in a maximum gap between testers that exceeds exactly equal spacing by a logarithmic factor. For most situations, this will probably be adequate to provide a sufficient amount of testing robustness. In some embodiments, much more uniform spacing of testers can be achieved by taking the location of the testers into account when doing the shuffling, or by inserting the testers into the object code instead of the source code.

Interval Construction

In addition to the testers, the other component of the self-checking mechanism is the code intervals over which the testers compute hash functions. It will generally be desirable for these intervals to provide uniform, redundant coverage of the entire executable and to be hard to discover. Also, each interval will generally need its own corrector, which will be set so that the interval hashes to zero (or some other pre-defined value). Finally, the correctors preferably have a global ordering that allows them to be set sequentially, without circular dependencies.

Figure 4:
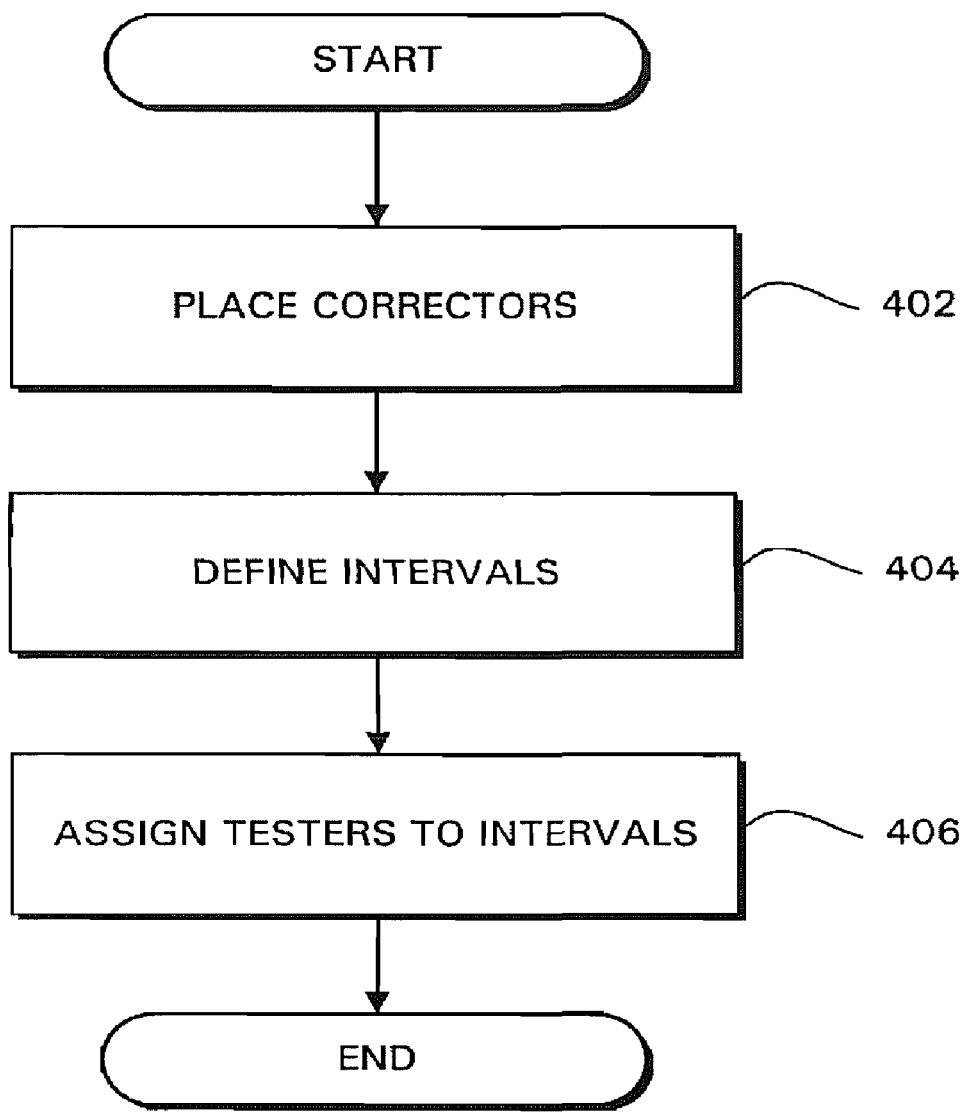
FIG. 4 shows an approach to constructing self-checking intervals in accordance with an embodiment of the present invention.

In one embodiment, interval construction is based on corrector placement. As shown in FIG. 4, with this approach interval construction includes three basic steps: corrector placement (402), interval definition (404), and assignment of testers to intervals (406), each of which will be described in more detail below.

Corrector Placement

In a preferred embodiment, one interval, and hence one corrector, is needed per tester. Since it is desirable for the intervals to be approximately of equal size and approximately uniformly spaced, it will also be desirable for the correctors to be approximately uniformly spaced as well. A preferred embodiment uses a binary code modification tool to insert correctors as dead code (between basic blocks) once basic block shuffling is completed.

It is illuminating to consider an alternative embodiment, which uses source-code insertion, to understand the virtues of the preferred embodiment described above. In the alternative embodiment, a very large number of correctors, consisting of obfuscated NOPs, are inserted into the source code by including them in appropriately chosen source-language functions. In the absence of basic-block shuffling, the distribution of these correctors will typically be quite non-uniform; indeed, the correctors will often be clumped closely together. Binary code modification tools can be used to shuffle basic blocks to provide a much more uniform distribution of correctors in the executable. Even assuming random shuffling, however, this will generally still not produce uniformly spaced correctors. Instead, the corrector gaps will typically have a Poisson distribution, which implies that the expected maximum gap size is a logarithmic factor greater than the average gap size. To overcome this problem, many more correctors than needed (e.g., at least a logarithmic factor more) can be inserted, and a "pruning" step can be used to select a relatively small subset of correctors that are actually used. Although this alternative embodiment can be effective in practice, it has at least three possible drawbacks: the insertion of many more correctors than needed, the extra computation step of corrector pruning, and the need to carefully place correctors in replicated functions in the source code to make sure there are enough correctors in the executable (e.g., making sure the correctors are not placed in dead code).

Thus, in a preferred embodiment an executable-based corrector-insertion method is used. Specifically, once the basic blocks have been shuffled, a binary code modification tool is used to insert the correctors. This approach has some significant advantages over a source-code-based insertion scheme. For example, it provides relatively fine-grained control over the positioning of the correctors in the executable. Correctors can be inserted as dead code (between basic blocks) instead of, or in addition to, as obfuscated NOPs. In addition, dead-code correctors can simply consist of the 32 correction bits, rather than forming valid instructions or instruction sequences. Moreover, the corrector pruning step can be dispensed with (although in some embodiments it may be desirable to retain this step, as it may provide some possibly redundant smoothing of the corrector distribution).

Figure 5:
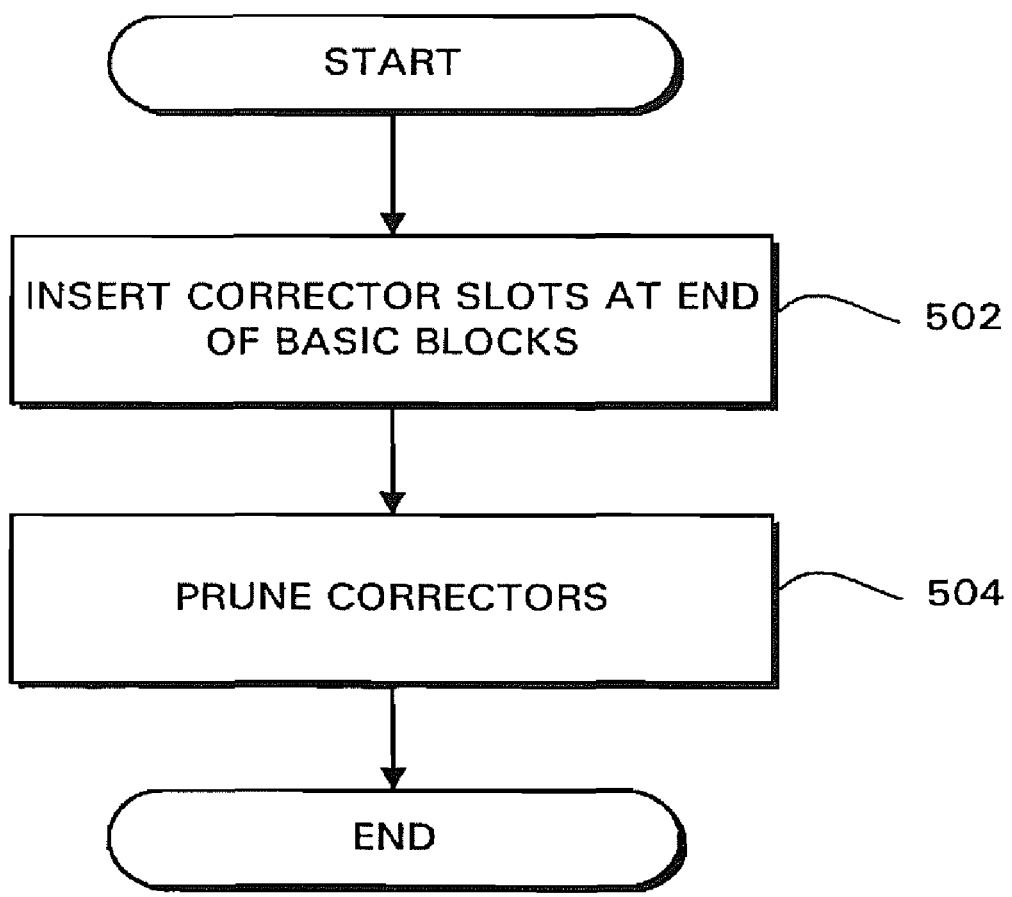
FIG. 5 shows a method of placing self-checking correctors in accordance with an embodiment of the present invention.

As shown in FIG. 5, in one preferred embodiment the corrector placement process works as follows: In step 502 word-length (32 bit) corrector slots are inserted at the end of basic blocks (e.g., after unconditional jump instructions). A gross number of corrector slots to insert (before pruning) can be chosen. In one embodiment, to determine where to insert the correctors, the total number of usable basic blocks for insertion is determined, and this number is divided by the number of correctors. If the result is k, a corrector is inserted after each k basic blocks.

Referring once again to FIG. 5, the correctors are next pruned down to the set actually used 504. This can be performed as follows: While there are too many correctors, apply the following step to remove a corrector: find the two adjacent correctors closest together (in bytes) and eliminate the one whose removal creates the smallest new gap. This algorithm can be implemented efficiently using a heap (priority queue) data structure to keep track of the gap sizes, at a logarithmic cost per deleted corrector. In one embodiment, 1000 gross correctors are used, and about 200 testers and net correctors.

An improved technique is to space the correctors using a byte count (instead of a block count) and to eliminate the pruning step entirely. Insertion of testers inside basic blocks, rather than just between basic blocks, may also provide sufficient additional uniformity as to be worthwhile. However, since in many applications the basic blocks are extremely small compared to interval lengths, this may not be the case for all applications.

Interval Definition

In preferred embodiments, the intervals to be tested are defined based on the placement of the correctors using a random choice of interval endpoints between appropriate correctors to help make it hard for an attacker to determine these endpoints. In addition, an overlap factor is used, such that most bytes in the executable are covered by k intervals. In one embodiment, an overlap factor of 6 is used.

Figure 6:
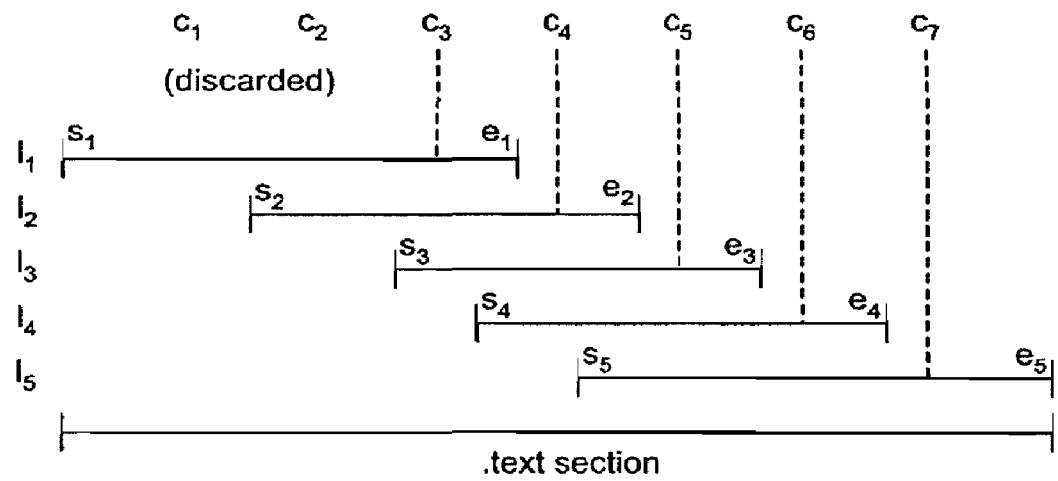
FIG. 6 illustrates the interval construction process in an embodiment of the present invention.

Suppose it is desired to have n test intervals $I_i$, $1 \leq i \leq n$. To do this, use n+k−1 correctors, of which k−1 will be discarded. Label the correctors $c_1, c_2, \ldots, c_{n+k-1}$ in the order they occur in the executable. Choose a start $s_i$ and end $e_i$ for each of the intervals, as follows. Start $s_i$ is at the beginning of the code (or .text) section, and end $e_n$ is at the end of the code section. For i in the range $1<i \leq k$, choose $s_i$ uniformly at random between $c_{i-1}$ and $c_i$ and $e_{n-i+2}$ uniformly at random between $c_{n+k-i}$ and $c_{n+k-i+1}$. For i in the range $k<i \leq n$, choose two points uniformly at random between $c_{i-1}$ and $c_i$. The smaller point is $s_i$ and the larger point is $e_{i-k}$. Then associate corrector $c_{k+i}$ with interval $I_i$, and discard the first k−1 correctors. The construction is illustrated in FIG. 6.

This choice of intervals has two desirable properties. Except near the beginning and end of the code section, every byte of the executable is contained in k (or possibly k+1) test intervals. The first corrector in test interval $I_i$ is $c_{i+k-i}$, which means that corrector values can be set in the order $c_k$, $c_{k+1}, \ldots, c_{n+k-1}$ to make successive intervals $I_1, I_2, \ldots, I_n$ hash correctly without having later corrector settings invalidate earlier settings. That is, there are no circular dependencies.

The ends of the code section are not covered as redundantly as the rest of the code. However, this is not believed to affect the robustness of the testing mechanism in any significant way. In addition, it is easy to modify the interval construction scheme so that the corrector setting works from the two ends of the code toward the middle, so that the non-redundant coverage occurs in the middle. The region of non-redundant coverage could also be chosen randomly, or to be unimportant code. Also, as noted below, the interval construction could be modified to allow for circularities, and the resulting system of linear equations could be solved to get corrector values. It is expected that such a method would be even more robust.

Assignment of Testers to Intervals

Once intervals are constructed, the next step is to assign testers to the intervals. The objectives of this assignment are coverage and security. For purposes of coverage, it is desirable for each byte to be tested often as the code is running, and for purposes of security, it is desirable to force an attacker to disable many or most testers in order to successfully modify even a single byte of the program without detection. One way to accomplish these goals is to harness the power of randomization: e.g., assign each tester to a different interval using a random permutation to define the assignment. Both experimental and theoretical evidence suggest that a random assignment is a good one.

For example, almost every byte in the code is covered by k testing intervals and hence tested by k testers. With random assignment, the most important bytes will be redundantly tested, even if a significant fraction of the testers are ineffective because of infrequent execution.

Additional observations can be made with reference to a graph, the tester graph, that models the pattern of testers testing other testers. The vertices of the graph are testers. The graph contains an edge from tester A to tester B if tester B is contained in the interval tested by tester A. (It is assumed that the construction of intervals allows the possibility that an interval boundary might be in the middle of a tester. In such a case the graph would not contain the corresponding edge. However, the interval construction could easily be modified to move interval boundaries outside of testers).

Suppose that all testers are effective (e.g., they execute frequently when the program is running normally). Suppose further that an attacker modifies a byte of the program that is in an interval tested by tester X. Then, to avoid detection, the attacker must disable every tester Y such that there is a path from Y to X in the tester graph. Suppose the tester graph is strongly connected; that is, there is a path from every vertex to every other vertex. Then a successful attack, changing even a single byte, would require disabling every tester.

Thus, it is desirable for the tester graph to be strongly connected (or at least approximately so). With the preferred method of interval construction and random tester assignment described above, the tester graph is strongly connected with high probability. This is true as long as the intervals are sufficiently uniform and the redundancy factor k is sufficiently high. Experiments confirmed that the number of components drops rapidly as k increases. For small values of k, there is one large component and a small number of single node components. Thus it is close to strongly connected.

If strong connectivity were the only desired property of the tester graph, random assignment would not be necessary. For example, strong connectivity could be guaranteed by embedding a large cycle in the tester graph. Strong connectivity is not enough to guarantee the robustness of the testing mechanism, however. For example, if the tester graph consists only of one big cycle and some testers are ineffective (meaning they are in parts of code that do not get executed during an attack), then the effective tester graph consists of disconnected pieces, and certain parts of the program may be (hypothetically) attacked by disabling only a few testers.

A stronger connectivity property is that, even if a fraction of the testers are ineffective, a single byte change would require disabling many or most of the effective testers to avoid detection. This kind of robust connectivity is related to the expansion property, which is possessed by certain random graphs. "Expansion" means that there is a constant factor $\alpha>1$, such that for any subset X of at most a constant fraction of the vertices, at least $\alpha|X|$ other vertices have edges into X. Expansion implies both strong and robust connectivity, depending on $\alpha$. The possession of this property by random graphs is the main reason that random tester assignment is used in a preferred embodiment. The expansion property is relatively hard to test empirically (doing so takes exponential time); however, the tester graphs described herein have been found to possess sufficiently robust connectivity regardless of whether they satisfy the expansion property in a technical sense.

Integration

In this section we provide an example of a process for constructing an illustrative self-checking mechanism for a security-critical application program, such as a digital rights management application. In this example, the process is complicated by two factors: the existence of software watermarks, whose values are set at installation time, and the corresponding use of a patching mechanism to put the watermark values into the application program at installation time. It would be desirable for a self-checking construction to work with the watermarking mechanism in an integrated fashion. This generally requires computing corrector values after computing watermark values, and using the same patching mechanism to put both watermark values and corrector values into an installed application program. In addition, we designed our software tools to install both watermarks and the self-checking mechanism in an integrated fashion. This section provides a high-level view of the construction process.

In our description we make use of the concept of a tamper-resistance object (TRO). A TRO can be viewed as a contiguous sequence of bits that is inserted into the executable to help perform some software security function. In this example, there are three kinds of TROs: testers, correctors, and watermarks. Each TRO can either be stamped or unstamped. An unstamped TRO contains locations that will be set later, via a stamping process. For example, an unstamped tester does not yet contain information about the interval it is to test (i.e. the beginning and end of the interval). This information is added later via stamping. An unstamped corrector does not yet contain the corrector value. An unstamped watermark does not yet contain the watermark value.

In order to perform stamping, we need a way to locate unstamped TROs in the executable. We can either keep explicit track of their locations after they are inserted or use pattern-matching to locate them. If we use pattern-matching, we can place some or all of the pattern to be matched in the positions that will later be stamped with final values. Our current design uses pattern-matching to locate the TROs.

To summarize, construction of an individual TRO is a two-step process. First, we insert the unstamped TRO, which contains a pattern to match so that we can find it. Second, we stamp some or all of the TRO with its final value, in the process possibly overwriting some or all of the pattern used to locate it. This idea generalizes to multi-step stamping, too. In a preferred embodiment, unstamped TROs do not interfere with correct program execution, so that debugging can be done on unstamped executables.

Unstamped TROs can be inserted into the executable either at the source level or at the object level (e.g., via a binary code modification tool). In a preferred embodiment, testers and watermarks are inserted at the source level and correctors are inserted at the object level.

In one embodiment, the construction of the security mechanism is a multi-step process:

Before program creation:

Step 1A: Create Testers

Using, e.g., the method described in Appendix A, a list of customized testers is created, each one different. The number of testers created is preferably at least as large as the number of testers to be inserted into the program. An alternative design would be to generate testers one-at-a-time, as they are inserted into the program.

During program creation:

Step 1B: Insert unstamped testers and watermarks into the source code.

Unstamped testers and unstamped watermarks are inserted into the source code. Each such TRO is inserted as a macro call which, when expanded during compilation, inserts the appropriate unstamped TRO into the code. There is one macro for each customized tester.

During execution of the binary code modification tool:

Step 2: Insert unstamped correctors into the executable

Unstamped correctors are inserted into the executable using a binary code modification tool after basic blocks have been shuffled.

After execution of the binary code modification tool:

Step 3: Construct the self-checking mechanism.

Locate all the testers and correctors in the object code. Prune the correctors. Create the intervals to be tested. Assign the intervals to testers (e.g., 1-to-1) and stamp each tester with the start and end of its interval.

Step 4A: Split the executable.

Locate the correctors and watermarks. Split the executable into two parts: a patch list, such that each corrector and watermark is in a patch, and a golden master, containing the rest of the executable. Compress and encrypt the golden master, which is now ready for distribution. Create an intelligent patch list, which contains both the patches and information on how to compute the corrector values. This information summarizes hash computations for the parts of tester intervals contained in the golden master. Having this information allows computation of corrector values from just the intelligent patch list, without using the global master. Retain the intelligent patch list for use by the deployment manager (e.g., the entity responsible for providing and/or installing the application on a user's computer system) during installation.

During installation and activation:

Step 4B: Compute watermark and corrector values.

On the deployment manager, retrieve the intelligent patch list corresponding to the golden master possessed by the client. Compute watermark values corresponding to this activation, and stamp them into the patch list. Compute successive corrector values based on the watermark values and previously computed corrector values, and stamp them into the patch list. Construct a simple patch list containing the stamped correctors and watermarks. Compress and encrypt the stamped patch list and send it to the client.

Step 4C: Patch golden master on client.

Incrementally decrypt and decompress the golden master and the patch list and merge them to form an activated version of the application program.

One additional feature of this process is its interaction with customization. Software customization can be performed using, e.g., a binary code modification tool. If multiple customized versions of the application program are created, then steps 2-4 will generally need to be done for each customized version. The deployment manager stores (or is able to reconstruct) an intelligent patch list for each customized version. The deployment manager generally does not, however, need an entire copy of each customized version to compute corrector values, because of the hash summary information contained in the intelligent patch lists.

Dynamic software self-checking mechanisms have been described that are suitable for use with security-critical applications such as digital rights management applications. Embodiments of the software self-checking mechanisms can be integrated with software watermarking techniques for enhanced security and ease of applications, and can substantially raise the level of tamper-resistance protection against an adversary, even if the adversary is equipped with static analysis tools and knowledge of the self-checking algorithm and most details of the implementation.

Appendix A: Tester Design

Recall that a tester computes a hash (or other) function over an interval of data in the .text section and calls the anomaly reporting system if that function does not result in a predefined value (e.g., does not hash to zero). For both performance and summarizability, in one embodiment a linear hash function is used that can be computed recursively as follows:

$$HASH[0]=0$$

$$HASH[n+1]=K*(DATA[s+n]+HASH[n])$$

where K is an odd integer and s is the start of the interval.

The computation should be stealthy. This means (1) the tester should look like assembled source code (e.g., assembled C source code); (2) no .text section virtual addresses should appear in the general purpose registers; and (3) the testers should only need a small number of bytes to implement.

We started with a prototype tester in assembly language that meets these requirements. Then we applied a variety of customizations to ensure that each tester had a unique code sequence, thus increasing the difficulty of an auto-collusion attack. The result is a set of almost 3 million distinct tester implementations, each occupying less than 50 bytes.

A.1 Assembly Tester Prototype

To help make our testers stealthy, we initially implemented a simple tester prototype in C and compiled it to get a code fragment that was nearly identical to the one in Table 1. (Note that the compiler wrote the instructions within basic blocks in a slightly different order, presumably as an optimization, and included a redundant MOV instruction that we removed). By doing this, we hoped to minimize the presence of unstealthy assembly language constructs, specifically those that would not typically be compiler-generated.

TABLE 1

Assembly language tester prototype.

```
A:
    mov     ECX,obf_start        // ECX = obfuscated start
    mov     ESI,obf_end          // ESI = obfuscated end
    xor     EDX,EDX              // EDX = HASH = 0
    cmp     ECX,ESI              // i < end?
    jae     C                    // if so goto C
B:
    mov     EAX,[ECX+OBF]        // EAX = DATA[i]
    add     ECX,4                // i++
    add     EAX,EDX              // EAX = HASH + DATA[i]
    cmp     ECX,ESI              // i < end?
    lea     EDX,[EAX+EAX*2]      // HASH = k*(HASH+x[i])
    jb      B                    // if (i<end) goto B
C:
    testEDX,EDX                  // HASH != 0?
    je      E                    // if so, goto E
D:
    callResponseFunc             // ResponseFunc( )
E:
```

Basic block A initializes two of the general purpose registers to constant 32-bit values which represent a random offset, OBF, from the actual start and end of the interval being tested. In addition, the hash value is initialized to zero and a test is performed to see if the interval has non-zero length.

The core of the tester is basic block B, which performs the iterated calculation of the hash function.

Register ECX contains the virtual address of the data element, register ESI contains the virtual address of end of the interval, and register EDX contains the hash value HASH[n] upon entering the block and HASH[n+1] upon exit.

The first MOV instruction in block B de-obfuscates the virtual address in the ECX register by adding OBF back into that value to access DATA[i]. This is accomplished using the 32-bit displacement value of a memory operand. Since OBF is random, both the displacement and the content of the ECX and ESI registers will never contain .text section virtual addresses.

In general, MUL or IMUL instructions are computationally expensive and relatively rare. Multiplication by small values can be accomplished with a small set of instructions that are both faster and stealthier. For example, the LEA instruction in block B implements multiplication by the value 3. We show below how this instruction can be customized to achieve different values for the hash function multiplier, K.

Basic block C is entered once the calculation of the hash of the interval is complete and calls the response function in block D if that value is non-zero.

The exact values for the obfuscation variable and the interval endpoints are determined at install time and stamped into the customized testers at the appropriate locations. The unstamped testers all have the value 0x401000 for the start and end of interval, corresponding to the start of the .text section, and zero for the obfuscation variable. In this way, unstamped testers can still run without triggering the response function or causing an access to an invalid memory location.

A.2 Customizations

In this section we discuss how to generate functionally equivalent testers that are as different as possible from each other. To do this we perform a series of customizations that include inter-basic-block, intra-basic-block, and instruction level customizations.

A.2.1 Basic Block Rearrangement and Jump Logic Inversion

Our first customization is to allow for basic block rearrangement. Blocks C and D are left at the end of the tester and pattern matching is only performed against the bytes in blocks A and B to simplify the interaction with a binary code modification tool. However, we can exchange blocks A and B.

In addition, at the end of blocks A and B we can do jump logic inversion. For example, suppose a basic block ends as follows:

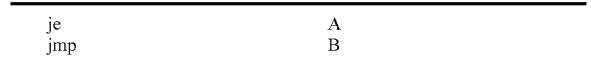

then we can negate the conditional branching logic and switch the two targets as follows:

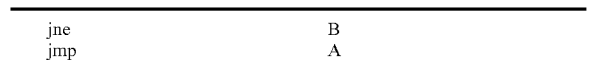

Finally we eliminate any "JMP 0" instructions that may result from the above two customizations, which are effectively unstealthy NOPs. This constraint limits the number of customizations to three possible configurations.

A.2.2 Hash Function Multipliers

Optimizing compilers for the Intel x86 instruction set have heuristics to avoid computationally expensive multiplication instructions. In particular, when a computation involves a multiplication by a relatively small integer, the compiler prefers small combinations of LEA, MOV and SHL instructions instead. Indeed, MUL and IMUL instructions are relatively rare and for the purposes of stealth we prefer using this alternative form because the individual instructions are much more common.

In the tester prototype described above, the multiply was compiled into a single LEA instruction. By setting the scale value in the SIB byte we can use this LEA instruction to implement the three constant odd multipliers 3, 7, and 9.

Similarly, we can use two LEA instructions:

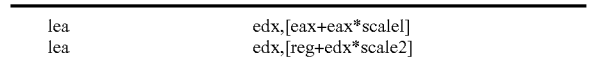

By setting scale1 and scale2, the scale value in the SIB byte of each instruction, and the register reg to either EAX or EDX, we can effectively implement a multiplication by any value in the set {7, 9, 11, 13, 15, 17, 19, 21, 25, 27, 37, 41, 45, 73}.

Alternatively, we can replace the LEA instruction by the following instruction sequence:

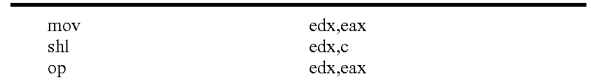

By setting c to a value in the range [5, 11], and the opcode in the third instruction to either SUB or ADD, we can effectively implement a multiplication by any value of the form $2^c \pm 1$.

There are many other constructs that we could use, but these three are the most efficient and we believe most stealthy.

In particular, the other constructs generated by optimizing compilers involve combinations of the LEA technique and the SHL technique. It is desirable to decouple these two techniques to the extent possible to avoid auto-collusion attacks on the hash function multipliers.

A.2.3 Intra-Basic Block Customization

We can rearrange instructions within each of the basic blocks. Some of the instructions can be interchanged to yield an equivalent computation. We can represent the possible sequences of instructions in a basic block by a dependency graph. A dependency graph consists of a set of nodes that represent instructions within the basic block. An edge from node i to node j in this graph means that the instruction corresponding to node j cannot appear in the instruction sequence until the instruction corresponding to node i has appeared. This dependency occurs in one of the following two situations:

if instruction j uses a register or flag that contains the result of a computation by instruction i, or if instruction j sets a register or flag that is needed by a subsequent instruction and instruction i also sets that register or flag. (This condition is more conservative than necessary, but is relatively easy to test and captures all but anomalous cases.)

Figure 7:
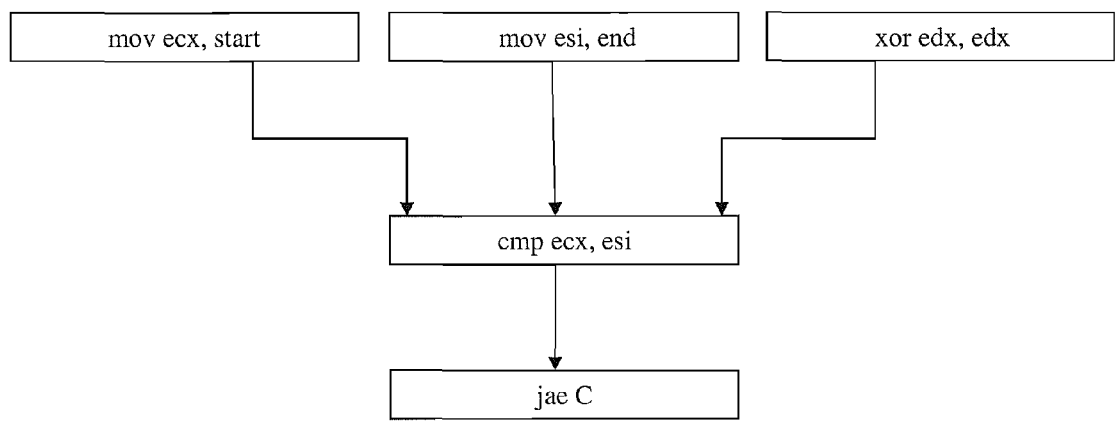
FIG. 7 shows the dependency graph for a block of self-checking code in an embodiment of the present invention.

FIG. 7 shows a dependency graph for Basic Block A. The graph shows that the first three instructions can appear in any order, since they do not depend on any other instructions, but the CMP instruction cannot appear until the first three instructions have appeared.

Figure 8:
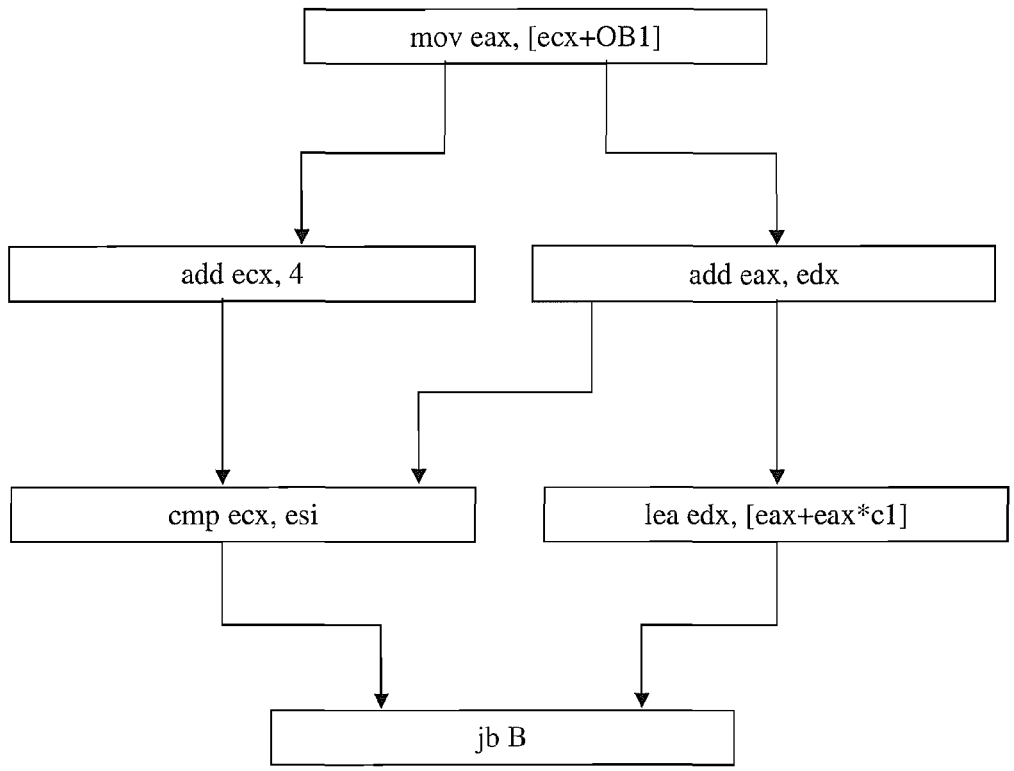
FIG. 8 shows the dependency graph for another block of self-checking code in an embodiment of the present invention.

FIG. 8 shows the dependency graph for Basic Block B. The LEA instruction does not set any flags, so it can appear in a variety of places, even between the CMP and JB instructions.

Figure 9:
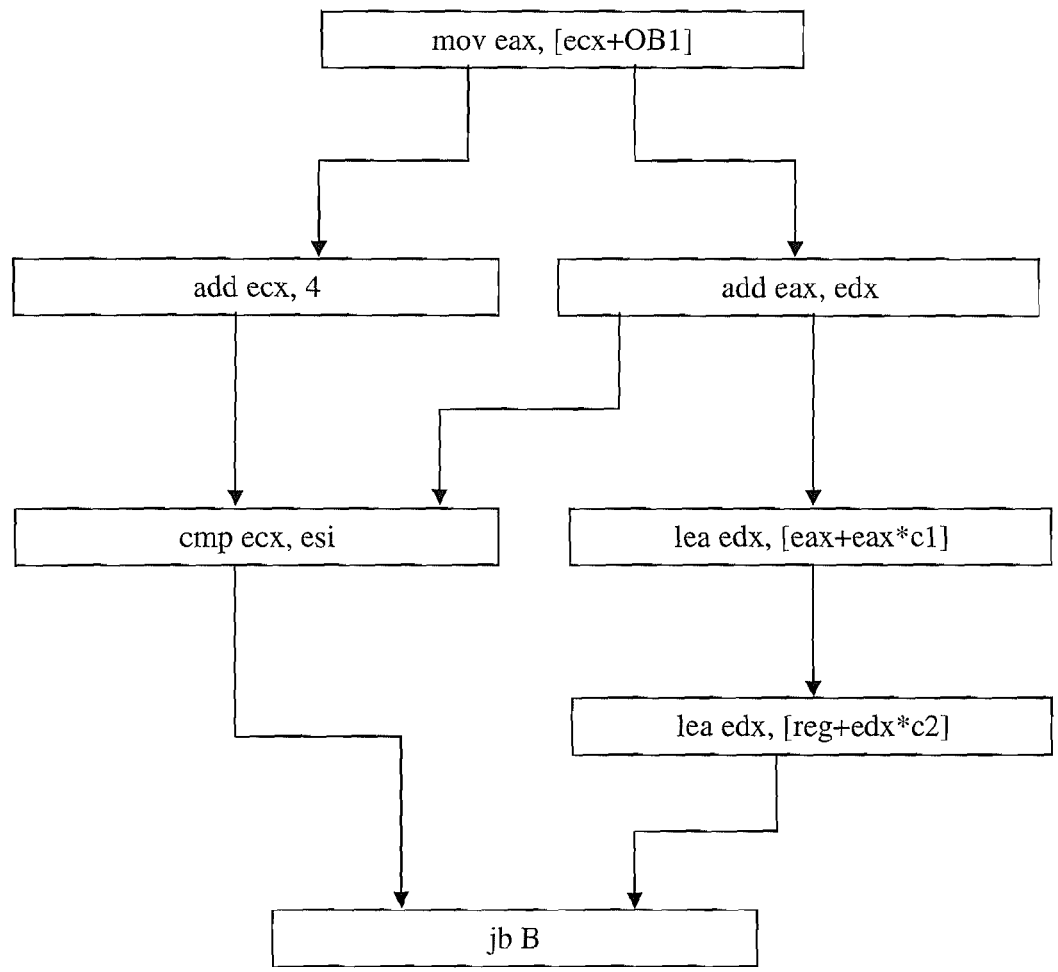
FIG. 9 shows the dependency graph for another block of self-checking code in an embodiment of the present invention.
Figure 10:
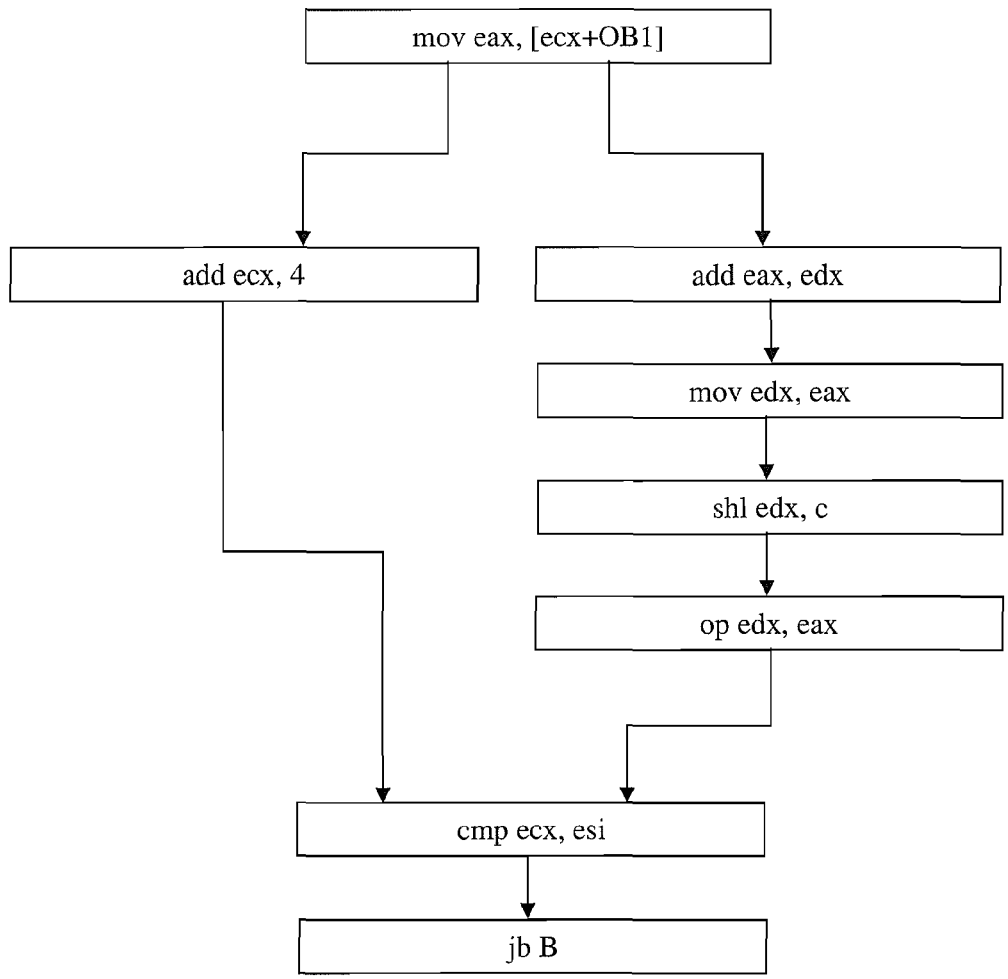
FIG. 10 shows the dependency graph for another block of self-checking code in an embodiment of the present invention.

FIGS. 9 and 10 show the dependency graphs for the versions of Basic Block B with alternative hash functions.

A.2.4 Miscellaneous Instruction Level Customizations

The tester uses registers EAX, ECX, EDX, and ESI. These registers can be permuted freely as long as they are used consistently throughout the computation.

The instructions ADD, CMP, TEST, XOR, which take two register arguments, have two forms, depending on the direction bits. See *Intel Architecture Software Developer's Manual, Volume 2: Instruction Set Reference*, Intel Corporation, 1997.

The values for the start and end of the hash interval and the displacement value in the MOV instruction will all get stamped.

A.2.5 Calculation of the Number of Customized Testers

In this section we calculate the number of testers that can be generated using the customizations described above.

There are three basic block flow customizations.

The dependency graph for block A permits 3!=6 possible instruction sequences. Block B with a dual LEA hash function multiplier has nine possible instruction sequences. In each of these we can select fourteen possible multipliers. Similarly Block B with a single LEA hash function multiplier has five instruction sequences and three possible multipliers, and Block B with the MOV/SHL/op multiplier has five instruction sequences and fourteen possible multipliers. This gives a total of 6*(9*14+5*3+5*14)=1226 customizations.

In addition we have 4!=16 different ways to permute the registers. And there are 5 instructions on which we can do direction bit changes for an additional 32 customizations.

In total these customizations yield 3*1226*24*32=2,916,864 varieties of testers.

Furthermore, we stamp the start of interval, end of interval, and obfuscation variable with three different 32-bit numbers on each tester.

Although the foregoing invention has been described in some detail for purposes of clarity, it will be apparent that certain changes and modifications may be practiced within the scope of the appended claims. It should be noted that there are many alternative ways of implementing both the processes and apparatuses of the present invention. Accordingly, the present embodiments are to be considered as illustrative and not restrictive, and the invention is not to be limited to the details given herein, but may be modified within the scope and equivalents of the appended claims.

What is claimed is:

1. A method of creating a self-checking software program on a non-transitory computer-readable medium, the method comprising:
   creating a plurality of self-checking code sequences operable to calculate a function of a portion of the program, each self-checking code sequence having an interval start field and an interval end field;
   inserting the plurality of self-checking code sequences into the program source code;
   inserting a plurality of correctors, each having a corrector value field, into the program executable;
   assigning the self-checking code sequences to portions of the program, each of the portions containing at least one corrector;
   locating the self-checking code sequences and setting the interval start field and the interval end field to values corresponding to the start of the portion of the program and the end of the portion of the program, respectively;
   locating the correctors and setting the corrector value field of each such that the function calculated by the self-checking code sequence results in a predefined value when the portion of the program has not been improperly modified; and
   writing the self-checking software program onto a non-transitory computer-readable medium.

2. The method of claim 1, further comprising: inserting watermark values into the program.

3. The method of claim 1, wherein the self-checking code sequences are further operable to trigger a tamper response mechanism when an improper modification of the program is detected.

4. The method of claim 1, wherein the self-checking code sequences are assigned to overlapping portions of the program in a relatively random fashion.

5. The method of claim 4, wherein the self-checking code sequences are assigned to overlapping portions of the program such that a graph representing the assignment of self-checking code sequences to overlapping portions of the program is strongly connected.

6. The method of claim 1, wherein the function that each self-checking code sequence is operable to calculate comprises a hash function.

7. The method of claim 6, wherein the hash function is invertible.

8. The method of claim 6, wherein the hash function is relatively lightweight.

9. A self-checking software program, stored on a non-transitory computer-readable medium, created by a method comprising:
   creating a plurality of self-checking code sequences operable to calculate a function of a portion of the program, each self-checking code sequence having an interval start field and an interval end field;
   inserting the plurality of self-checking code sequences into the program source code;
   inserting a plurality of correctors, each having a corrector value field, into the program executable;
   assigning the self-checking code sequences to portions of the program, each of the portions containing at least one corrector; and
   locating the self-checking code sequences and setting the interval start field and the interval end field to values corresponding to the start of the portion of the program and the end of the portion of the program, respectively; and
   locating the correctors and setting the corrector value field of each such that the function calculated by the self-checking code sequence results in a predefined value when the portion of the program has not been improperly modified.

10. The self-checking software program of claim 9, created by a method further comprising: inserting watermark values into the program.

11. The self-checking software program of claim 9, wherein the self-checking code sequences are further operable to trigger a tamper response mechanism when an improper modification of the program is detected.

12. The self-checking software program of claim 9, wherein the self-checking code sequences are assigned to overlapping portions of the program in a relatively random fashion.

13. The self-checking software program of claim 12, wherein the self-checking code sequences are assigned to overlapping portions of the program such that a graph representing the assignment of self-checking code sequences to overlapping portions of the program is strongly connected.

14. The self-checking software program of claim 9, wherein the function that each self-checking code sequence is operable to calculate comprises a hash function.

15. A system configured to create a self-checking software program comprising:
   a processor; and
   a first non-transitory computer-readable storage medium communicatively coupled to the processor storing instructions that, when executed by the processor, cause the processor to:
   create a plurality of self-checking code sequences operable to calculate a function of a portion of the program, each self-checking code sequence having an interval start field and an interval end field;
   insert the plurality of self-checking code sequences into the program source code;
   insert a plurality of correctors, each having a corrector value field into the program executable;
   assign the self-checking code sequences to portions of the program, each of the portions containing at least one corrector;
   locate the self-checking code sequences and set the interval start field and the interval end field to values corresponding to the start of the portion of the program and the end of the portion of the program, respectively;
   locate the correctors and set the corrector value field of each such that the function calculated by the self-checking code sequence results in a predefined value when the portion of the program has not been improperly modified; and
   write the self-checking software program onto a second non-transitory computer-readable medium.

16. The system of claim 15, wherein the instructions are further configured to cause the processor to insert a plurality of watermark values into the program.

17. The system of claim 15, wherein the self-checking code sequences are further operable to trigger a tamper response mechanism when an improper modification of the program is detected.

18. The system of claim 15, wherein the self-checking code sequences are assigned to overlapping portions of the program in a relatively random fashion.

19. The system of claim 18, wherein the self-checking code sequences are assigned to overlapping portions of the program such that a graph representing the assignment of self-checking code sequences to overlapping portions of the program is strongly connected.

20. The system of claim 15, wherein the function that each self-checking code sequence is operable to calculate comprises a hash function.

* * * * *